United States Patent [19]

Kersten et al.

[11] Patent Number: 4,614,403
[45] Date of Patent: Sep. 30, 1986

[54] SPHERICAL SECTION OPTICAL MOUNT

[75] Inventors: Gerard M. Kersten, Ridgecrest, Calif.; Ronald A. Ferrante, Cambridge, Ohio

[73] Assignee: The United States of America as represented by the Secretary of the Navy, Washington, D.C.

[21] Appl. No.: 510,025

[22] Filed: Jul. 1, 1983

[51] Int. Cl.⁴ .............................................. G02B 7/02
[52] U.S. Cl. ..................................... 350/252; 350/251
[58] Field of Search ............... 350/251, 252, 255, 416, 350/319; 411/78–83

[56] References Cited

U.S. PATENT DOCUMENTS

| | | | |
|---|---|---|---|
| 1,151,008 | 8/1915 | Guthrie et al. | 350/252 |
| 1,539,830 | 6/1925 | Culver | 350/252 |
| 2,285,768 | 6/1942 | Drucker | 350/255 |
| 3,262,360 | 7/1966 | Gruner et al. | 350/252 |
| 3,563,637 | 2/1971 | Ferguson | 350/255 |
| 3,951,301 | 4/1976 | Meginnis | 350/319 |
| 3,989,358 | 11/1976 | Melmoth | 350/252 |
| 4,088,396 | 5/1978 | Edelstein | 350/252 |

*Primary Examiner*—John K. Corbin
*Assistant Examiner*—Loha Ben
*Attorney, Agent, or Firm*—Robert F. Beers; W. Thom Skeer; Stephen J. Church

[57] ABSTRACT

A two axis adjustable optical mount capable of lock down after alignment is provided by a dual ring arrangement which represents a segment of two concentric spheres. An optical element such as a lens or mirror is held within an inner ring by a retaining ring. The inner ring fits within the outer ring to form a partially concentric sphere arrangement across the diameter. Orthogonally mounted set screws can be used to adjust the relationship of the inner ring to the outer ring and a collar screw clamp is used to freeze the relationship between the inner and outer rings once the desired orientation is achieved.

1 Claim, 1 Drawing Figure

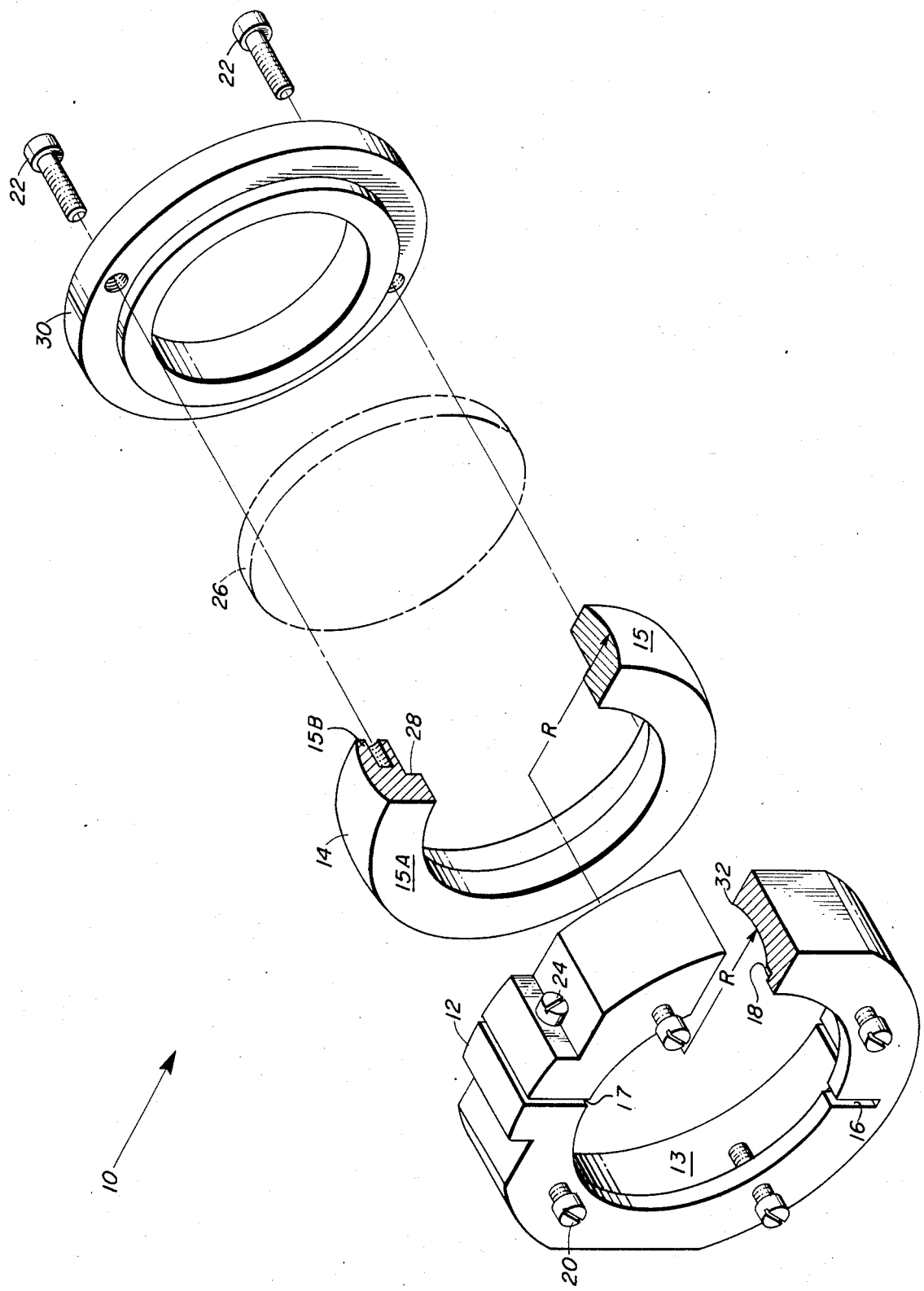

SPHERICAL SECTION OPTICAL MOUNT

BACKGROUND OF THE INVENTION

1. Field of the Invention

This invention pertains to clear aperture optical mounts. In particular this invention relates to optical mounts which permit orthogonal dual axis adjustment capable of lock down after alignment.

2. Description of the Prior Art

Conventional clear aperture optical mounts employ a fixed base plate connected to a movable mount plate by means of a spring loaded against a spherical ball. Options to spring loading include drive screw arrangements. Such mounts have a number of moving parts, reduced reliability, and tend to have limited clear apertures relative to mount size. In general, they are not lockable without affecting previous adjustments.

These devices provide a progression of moving parts. They do not permit direct adjustment of the optical amount within a single holder. They are prone to movement if the holder is locked down subsequent to the optical adjustment.

SUMMARY OF THE INVENTION

A spherical section optical mount is made using an outer ring containing an inner spherical ring. The unit is to be considered a slice taken through two concentric spheres along a major diameter to form a segmented spherical section. The outer segment is referred to as the outer ring and includes a lockable clamp around the inner ring. Dual axis adjustment is made by a series of set screws mounted in the outer ring which force inner ring pivoting along a major diameter of the spherical section. After alignment, the inner ring is clamped in place by tightening an outer ring collar screw. The outer ring includes a slot notch to permit freer movement of the inner ring during alignment.

BRIEF DESCRIPTION OF THE DRAWINGS

The FIGURE is an exploded perspective view of the present invention.

DESCRIPTION OF THE PREFERRED EMBODIMENT

As shown in the FIGURE, the spherical section of optical mount 10 has an outer ring 12, having an inner surface 13, and an inner ring 14 having an outer surface 15. Outer surface 15 is a section of a sphere defined by a pair of planes which coincide with the axially opposite parallel sides 15A and 15B of inner ring 14, these planes being spaced oppositely of the center of such sphere. Inner surface 13 is a spherical section having, as shown in the FIGURE, substantially the same radius R as outer surface 15 so that surface 15 conforms to surface 13 and may be pivotally received therein for tilting or rotation, as further discussed below, of the inner ring in relation to the outer ring by relative movement between the rings at surfaces 13 and 15. Inner ring 14 is inserted within outer ring 12 so that surfaces 13 and 15 can be considered a slice taken through two concentric spheres along a major diameter to form a segmented spherical section. If the spheres are imagined to be complete, the orientation is such that inner ring 14 is able to rotate within outer ring 12 along any major diameter of the sphere. Ideally, inner ring 14 and outer ring 12 are made of dissimilar metals, such as brass and aluminum, limiting friction to prevent freeze up. Other ring 12 includes a slot notch 16 for ease in expansion and contraction and for insertion and removal of inner ring 14. To provide such expansion and contraction ring 12 has, as shown in the FIGURE, a slot 17 extended entirely through it at its side diametrically opposite notch 16. Outer ring 12 has a notched lip 18. The notch permits inner ring 14 to rotate without hitting lip 18. It is evident from the FIGURE that lip 18 is mounted on ring 12 and extends inwardly from surface 13 thereof and that, when surface 15 is received in surface 13, lip 18 is disposed in axially spaced relation to side 15A of ring 14.

Four set screws 20 serve as an adjustment means for controlling the amount of tilt of inner ring 14 with respect to outer ring 12. It is apparent from the FIGURE that screws 20 screw threadedably engage lip 18, are spaced circumferentially thereabout, and are extended from the lip toward side 15A at inner ring 14 for engagement with this side when the inner ring is received in outer ring 12 so that suitable rotation of screw 20 pivots the inner ring within the outer ring. Three set screws spaced 120° apart may also be used. The advantage of set screws 20 or any similar positive action means is that, as is evident from the FIGURE, they force inner ring 14 to pivot to a fixed location or selected position with respect to outer ring 12. It is not dependent on springs or other sensitive devices which can fluctuate. When inner ring 14 has its orientation fixed, a locking means, such as a collar screw 24, which is extended across slot 17 as shown in the FIGURE, is used to clamp outer ring 12 tightly to inner ring 14 thus releasably retaining ring 14 in such a selected position.

To hold an optical element 26, such as a lens or mirror, within inner ring 14, a notched recess 28 is provided similar to lip 18 of outer ring 12. Optical element 26 sits against lip 28 and is held in place by a retaining ring 30 or other means for mounting optical element 26 which is mounted to inner ring 14 via screws 22 or any other fastening mechanism.

The matching radius of curvature of inner ring 14 and outer ring 12 when they are fitted together permits inner ring 14 to have rotational or pivot freedom within outer ring 12 while still permitting inner ring 14 to be securely locked within outer ring 12. This is because outer edge 32 is smaller across its opening than the major diameter, 2R. In this regard, slot notch 16 provides a quasi point for flexing outer ring 12.

It is obvious to those skilled in the art that numerous modifications to the above invention may be made.

What is claimed is:

1. An optical mount comprising:
   an inner ring having an outer surface which is a section of a sphere defined by a pair of planes spaced oppositely of the center of said sphere;
   means for mounting an optical element within the inner ring;
   an outer ring having the inner ring pivotally received therein and having an inner surface which is a spherical section conforming to said outer surface and is pivotally received therein;
   means for pivoting the inner ring to a selected position in relation to said outer ring by relative movement between said rings along said outer surface and said inner surface, said pivoting means having an annular lip mounted on the outer ring and extended inwardly from said inner surface thereof in axially spaced relation to one side of the inner ring, and
   a plurality of elements screwthreadably engaged with said lip and circumferentially spaced thereabout, said elements being extended from said lip into engagement with said one side; and
   means for releasably retaining the inner ring in a selected such position.

* * * * *